United States Patent
Uchimura et al.

(10) Patent No.: US 10,946,751 B2
(45) Date of Patent: Mar. 16, 2021

(54) POWER SUPPLY DEVICE FOR VEHICLE

(71) Applicant: SUBARU CORPORATION, Tokyo (JP)

(72) Inventors: Takahiro Uchimura, Tokyo (JP); Yuji Ohori, Tokyo (JP); Yuki Natsume, Tokyo (JP); Shota Inudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/653,226

(22) Filed: Oct. 15, 2019

(65) Prior Publication Data

US 2020/0180440 A1 Jun. 11, 2020

(30) Foreign Application Priority Data

Dec. 10, 2018 (JP) .................................. 2018-230757

(51) Int. Cl.
*B60L 50/61* (2019.01)
*B60W 20/13* (2016.01)
(Continued)

(52) U.S. Cl.
CPC ............... *B60L 50/61* (2019.02); *B60L 50/51* (2019.02); *B60L 53/24* (2019.02); *B60L 58/12* (2019.02);
(Continued)

(58) Field of Classification Search
CPC .......... B60L 50/61; B60L 50/52; B60L 58/12; B60L 58/18; B60L 9/14; B60L 7/10;
(Continued)

(56) References Cited

U.S. PATENT DOCUMENTS

2011/0246013 A1* 10/2011 Yee .......................... B60L 50/72
701/22
2011/0309786 A1* 12/2011 Hassan ................. F03D 3/0427
320/101

(Continued)

FOREIGN PATENT DOCUMENTS

| JP | 2013-166499 A | 8/2013 |
| JP | 2016-132402 A | 7/2016 |
| JP | 2018-523053 A | 8/2018 |

*Primary Examiner* — Hal Kaplan
*Assistant Examiner* — Jagdeep S Dhillon
(74) *Attorney, Agent, or Firm* — McGinn IP Law Group, PLLC

(57) ABSTRACT

A power supply device for a vehicle includes first and second power supply systems, a switch, and first, second, and third mode controllers. The first power supply system includes: a first power supply including a first power storage and a first generator, and an electrical apparatus. The second power supply system includes a second power supply. When an SOC of the first power storage exceeds a lower limit, the first mode controller supplies electric power from the first power supply to the electrical apparatus. When the SOC decreases below the lower limit, the second mode controller supplies electric power from the second power supply to the electrical apparatus via the switch. When an abnormality is detected to have occurred in the switch during the second power supply mode, the third mode controller supplies the electric power from the first power supply to the electrical apparatus.

13 Claims, 11 Drawing Sheets

(51) Int. Cl.
*B60L 50/51* (2019.01)
*B60L 58/18* (2019.01)
*B60L 53/24* (2019.01)
*B60L 58/12* (2019.01)

(52) U.S. Cl.
CPC ............ *B60L 58/18* (2019.02); *B60W 20/13* (2016.01); *B60L 2210/40* (2013.01)

(58) Field of Classification Search
CPC ....... G07C 5/08; G07C 5/0816; H02M 5/458; H02M 1/15; H02M 3/335; H02J 7/00; H02J 7/25; H02J 7/0054; F02N 11/08; F02N 11/04; F02N 11/0866
USPC .... 307/10.1, 10.2, 10.3, 10.7, 64, 66, 38, 43
See application file for complete search history.

(56) References Cited

U.S. PATENT DOCUMENTS

| | | | |
|---|---|---|---|
| 2012/0181990 A1* | 7/2012 | Asakura | B60L 53/30 320/137 |
| 2017/0030316 A1* | 2/2017 | Sekiguchi | F02N 11/0866 |
| 2017/0092023 A1* | 3/2017 | Ishii | B60L 1/006 |
| 2017/0274780 A1* | 9/2017 | de Hoog | B60L 55/00 |
| 2019/0058411 A1* | 2/2019 | Kitamoto | B60L 50/75 |
| 2019/0101091 A1 | 4/2019 | Baxendale | |
| 2020/0039356 A1* | 2/2020 | Montione | B60L 50/40 |

* cited by examiner

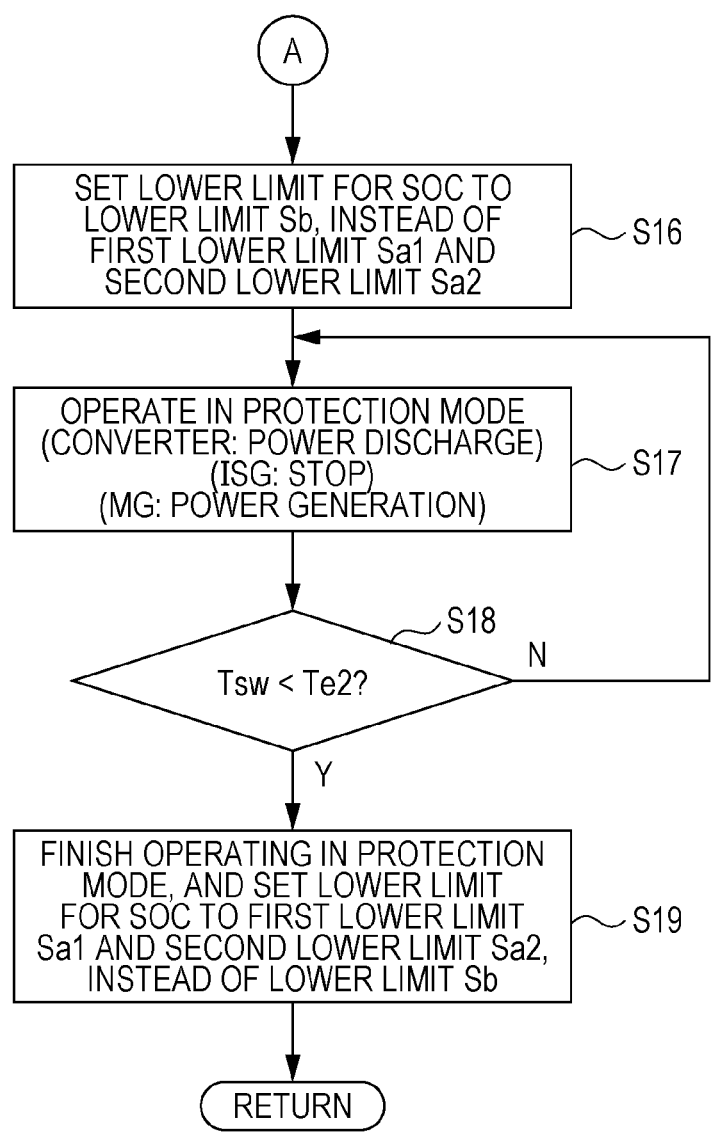

POWER SUPPLY DEVICE FOR VEHICLE

CROSS-REFERENCE TO RELATED APPLICATIONS

The present application claims priority from Japanese Patent Application No. 2018-230757 filed on Dec. 10, 2018, the entire contents of which are hereby incorporated by reference.

BACKGROUND

The disclosure relates to power supply devices for vehicles to be mounted in vehicles.

Power supply devices for vehicles to be mounted in vehicles include: a power storage, such as a lead battery or a lithium ion battery; and a generator, such as an alternator or an integrated starter generator (ISG). Some of such power supply devices further include: various electrical apparatuses, such as controllers and actuators; and a switch that controls various connections, such as those between the power storage and the electrical apparatuses, as disclosed in Japanese Unexamined Patent Application Publication Nos. 2013-166499 and 2016-132402 and Japanese Unexamined Patent Application Publication (Translation of PCT Application) 2018-523053.

SUMMARY

An aspect of the disclosure provides a power supply device to be mounted in a vehicle. The power supply device includes a first power supply system, a second power supply system, a switch, a first mode controller, a second mode controller, and a second mode controller. The first power supply system includes a first power supply and an electrical apparatus coupled to the first power supply. The first power supply includes a first power storage and a first generator. The second power supply system includes a second power supply including a second power storage and a second generator. The switch is disposed between the first power supply system and the second power supply system. The switch is configured to be turned on to couple the first power supply system to the second power supply system or turned off to separate the first power supply system from the second power supply system. The first mode controller is configured to, when a state of charge (SOC) of the first power storage exceeds a lower limit, execute a first power supply mode to supply electric power from the first power supply to the electrical apparatus. The first power supply mode permits the first power storage to discharge the electric power. The second mode controller is configured to, when the SOC of the first power storage decreases below the lower limit, execute a second power supply mode to supply electric power from the second power supply to the electrical apparatus via the switch. The second power supply mode prohibits the first power storage from discharging the electric power. The third mode controller is configured to, in a case where an occurrence of an abnormality is detected during the second power supply mode, execute a third power supply mode to supply the electric power from the first power supply to the electrical apparatus. The third power supply mode permits the first power storage to discharge the electric power with the SOC kept below the lower limit.

An aspect of the disclosure provides a power supply device for a vehicle to be mounted in a vehicle. The power supply device includes a first power supply system, a second power supply system, a switch, and circuitry. The first power supply system includes a first power supply and an electrical apparatus coupled to the first power supply. The first power supply includes a first power storage and a first generator. The second power supply system includes a second power supply including a second power storage and a second generator. The switch is disposed between the first power supply system and the second power supply system. The switch is configured to be turned on to couple the first power supply system to the second power supply system or turned off to separate the first power supply system from the second power supply system. The circuitry is configured to, when a state of charge (SOC) of the first power storage exceeds a lower limit, execute a first power supply mode to supply electric power from the first power supply to the electrical apparatus. The first power supply mode permits the first power storage to discharge the electric power. The circuitry is configured to, when the SOC of the first power storage decreases below the lower limit, execute a second power supply mode to supply electric power from the second power supply to the electrical apparatus via the switch. The second power supply mode prohibits the first power storage from discharging the electric power. The circuitry is configured to, in a case where an occurrence of an abnormality is detected during the second power supply mode, execute a third power supply mode to supply the electric power from the first power supply to the electrical apparatus. The third power supply mode permits the first power storage to discharge the electric power with the SOC kept below the lower limit.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 11 is a second flowchart of the example of the process of switching the power supply mode.

DETAILED DESCRIPTION

Figure 1:
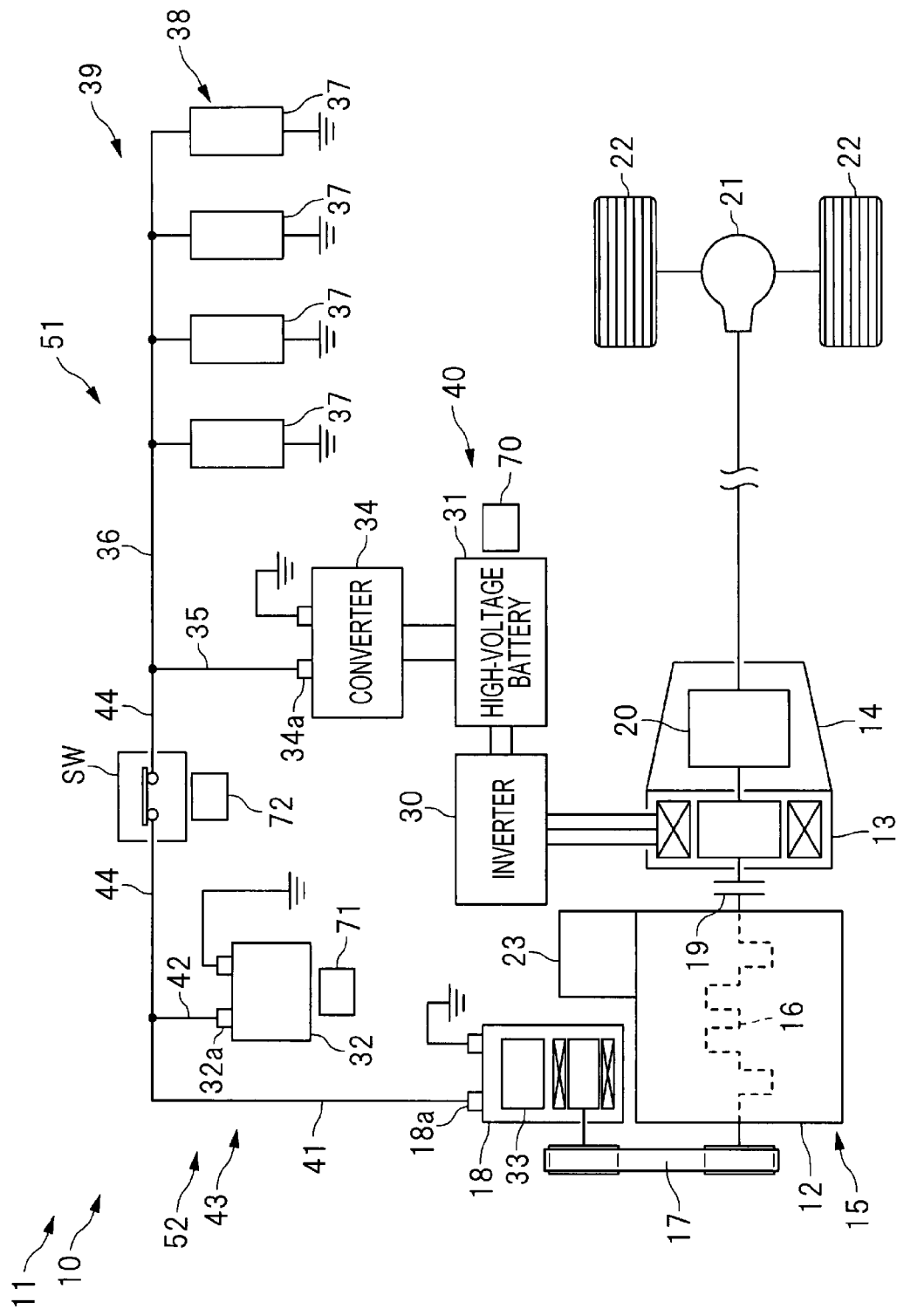
FIG. 1 schematically illustrates an example of a configuration of a vehicle equipped with a power supply device for a vehicle according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

A power supply device for a vehicle has a switch that is turned on or off in accordance with an operational status of electrical apparatuses. When the integrated starter generator (ISG) enters a power running state during the startup of the engine in a vehicle, for example, the switch is turned off to separate the power circuit for the IGS from the power circuit for controllers. This operation suppresses the power supply voltage applied to the controllers from excessively decreasing, thereby helping the controllers operate properly. However, if excessively large current flows through and damages the switch, for example, the power supply device may have difficulty continuing to operate properly. Thus, the protection of the switch is in demand.

It is desirable to provide a power supply device for a vehicle that can protect a switch.

Configuration of Vehicle

FIG. 1 schematically illustrates an example of a configuration of a vehicle 11 equipped with a power supply device 10 according to an embodiment of the disclosure. As illustrated in FIG. 1, the vehicle 11 is equipped with a power train 15 including an engine 12, a motor generator 13, and a transmission 14. The engine 12 has a crankshaft 16, a first end of which is coupled to a starter generator 18 via a belt mechanism 17 and a second end of which is coupled to the motor generator 13 via a clutch mechanism 19. The motor generator 13 is coupled to a variable-speed mechanism 20 in the transmission 14, and the variable-speed mechanism 20 is coupled to wheels 22 via a differential mechanism 21 and other members. The engine 12, which may be an internal combustion engine, has an engine accessory 23 including an injector and an ignitor.

The motor generator 13 provided in the power train 15 is coupled to a high-voltage battery 31 via an inverter 30. The high-voltage battery 31 may be, for example, a lithium ion battery or a lead battery with a terminal voltage of about 100 V. The motor generator 13, when being in a power running state, is supplied with the electric power from the high-voltage battery 31 and transmits motor power to the wheels 22, thereby driving the wheels 22. Then, the motor generator 13, when being in a power generation mode during the deceleration of the vehicle 11, supplies electric power to the high-voltage battery 31, thereby charging the high-voltage battery 31.

The starter generator 18 coupled to the engine 12 is also coupled to a low-voltage battery 32. The low-voltage battery 32 may be, for example, a lithium ion battery or a lead battery with a terminal voltage of about 12 V. The starter generator 18 may be an ISG that serves as both a generator and a motor. For example, when the remaining charged amount, or the SOC, of the low-voltage battery 32 decreases below a lower limit, the starter generator 18 enters a power generation state. When starting rotating the engine 12 or when assisting the engine 12 in starting moving or accelerating the vehicle 11, the starter generator 18 enters a power running state. The starter generator 18 has an ISG controller 33 to regulate an electric current supplied to a starter coil or a field coil. The ISG controller 33 may include an inverter, a regulator, a microcomputer, and various sensors.

When the clutch mechanism 19 disposed between the engine 12 and the motor generator 13 is disengaged, the transmission of the power generated by the motor generator 13 is not transmitted to the engine 12 so that the motor generator 13 solely runs the vehicle 11. When the clutch mechanism 19 is engaged, the power of the motor generator 13 is transmitted to the engine 12 so that both the engine 12 and the motor generator 13 run the vehicle 11 in combination.

Power Circuit

As illustrated in FIG. 1, the motor generator 13 is coupled to the high-voltage battery 31 via the inverter 30. The high-voltage battery 31 is coupled to a converter 34 that converts the voltage of the high-voltage battery 31. The converter 34 has a positive electrode terminal 34a coupled to a positive line 35, which is joined to a positive line 36. The positive line 36 is linked to an electrical apparatus group 38, which includes a plurality of electrical apparatuses 37 each of which serves as any given actuator or controller, for example.

The power supply device 10 is equipped with a power circuit 39 having a first power supply system 51. Components of the first power supply system 51 in the power circuit 39 are the motor generator 13, the inverter 30, the high-voltage battery 31, the converter 34, and the electrical apparatuses 37 described above. In short, the first power supply system 51 includes a first power supply 40 and the electrical apparatuses 37 coupled to the first power supply 40; the first power supply 40 includes the motor generator 13 and the high-voltage battery 31. In one embodiment, the motor generator 13 may serve as a "first generator", and the high-voltage battery 31 may serve as a "first power storage". As illustrated in FIG. 1, the first power supply 40 is equipped with the converter 34.

The starter generator 18 has a positive electrode terminal 18a coupled to a positive line 41. The low-voltage battery 32 has a positive electrode terminal 32a coupled to a positive line 42, which is joined to the positive line 41. The power circuit 39 provided in the power supply device 10 is equipped with a second power supply system 52 having a second power supply 43. Components of the second power supply 43 are the starter generator 18 and the low-voltage battery 32. In one embodiment, the starter generator 18 may serve as both a "second generator" and a "power generation motor", and the low-voltage battery 32 may serve as a "second power storage".

Disposed between the first power supply system 51 and the second power supply system 52 described above is a current-carrying line 44 via which the first power supply system 51 is coupled in parallel to the second power supply system 52. On the current-carrying line 44 is a switch SW that is turned on or off. When the switch SW is in an ON state, the first power supply system 51 is coupled to the second power supply system 52, whereas when the switch SW is in an OFF state, the first power supply system 51 is separated from the second power supply system 52.

The switch SW may be a semiconductor switch made of a metal oxide semiconductor field effect transistor (MOSFET), for example. Alternatively, the switch SW may be a mechanical switch that is turned on or off by means of electromagnetic force. The "ON state" of the switch SW refers to a state where the contact points of the switch SW are in contact with each other and an electric current can flow therebetween. The "OFF state" of the switch SW refers to a state where the contact points are separated from each other and no electric current can flow therebetween. The switch SW may be a relay or a contactor, for example.

Control System

Figure 2:
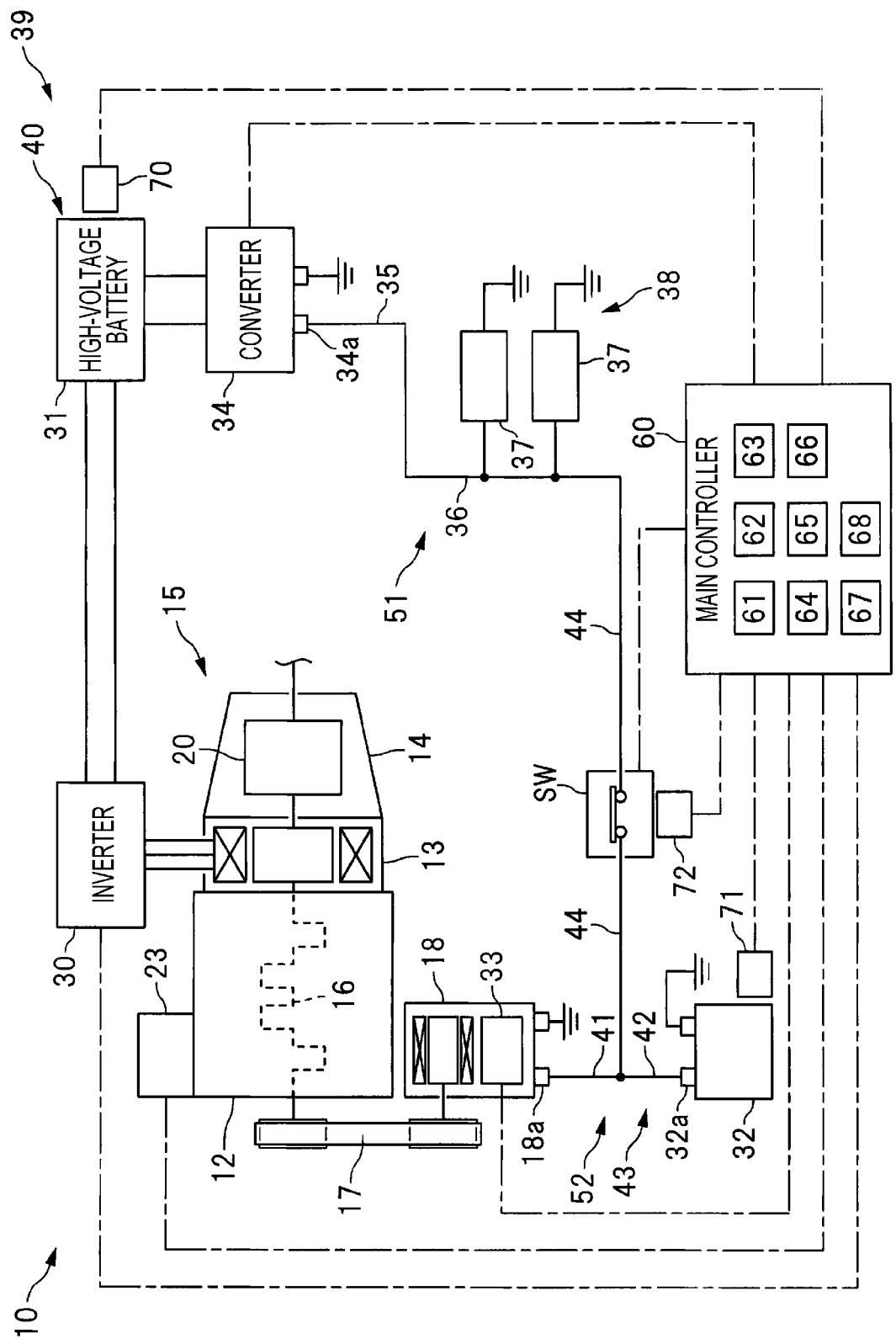
FIG. 2 illustrates an example of a power circuit and a control system provided in the power supply device for a vehicle.

FIG. 2 illustrates an example of the power circuit 39 and a control system provided in the power supply device 10. As illustrated in FIG. 2, the power supply device 10 includes a main controller 60 to operate the power train 15, the power circuit 39, and other members in collaboration with one another. The main controller 60 may be a microcomputer, for example. The main controller 60 includes: an engine controller 61 that controls the operation of the engine 12; a motor controller 62 that controls the operation of the motor generator 13; an ISG controller 63 that controls the operation of the starter generator 18; a converter controller 64 that controls the operation of the converter 34; and a switch controller 65 that controls the operation of the switch SW.

When the electric power is supplied to the individual electrical apparatuses 37 of the electrical apparatus group 38, the power supply device 10 operates in the three power supply modes: a regular mode, a backup mode, and a protection mode, details of which will be described later. In one embodiment, the regular mode may correspond to a "first power supply mode", a backup mode may correspond to a "second power supply mode", and a protection mode may correspond to a "third power supply mode". The first mode controller 66 of the main controller 60 executes the regular mode; the second mode controller 67 executes the backup mode; and the third mode controller 68 executes the protection mode.

The main controller 60, the ISG controller 33, the inverter 30, the converter 34, the engine accessory 23, and some other members are coupled to one another over an on-board network, such as a controller area network (CAN) or a local interconnect network (LIN), so that these members can mutually communicate with one another. The main controller 60 is coupled to a battery sensor 70, a battery sensor 71, and a switch sensor 72. The battery sensor 70 detects a charge or discharge electric current, an SOC, and some other factors of the high-voltage battery 31. The battery sensor 71 detects a charge or discharge electric current, an SOC, and other factors of the low-voltage battery 32. The switch sensor 72 detects a temperature, a resistance, and some other factors of the switch SW.

The battery sensor 70 transmits the detected charge or discharge electric current, SOC, and factors of the high-voltage battery 31 to the main controller 60. The battery sensor 71 transmits the detected charge or discharge electric current, SOC, and factors of the low-voltage battery 32 to the main controller 60. The switch sensor 72 transmits the detected temperature, resistance, and factors of the switch SW to the main controller 60. Moreover, the ISG controller 33 transmits a voltage or electric current generated by the starter generator 18 to the main controller 60, and an unillustrated controller in the converter 34 also transmits a voltage or electric current discharged from the converter 34 to the main controller 60.

As described above, the battery sensor 70 provided in the high-voltage battery 31 detects a charge or discharge electric current, a terminal voltage, a temperature, an SOC, and other factors of the high-voltage battery 31. The "SOC" of the high-voltage battery 31 which indicates a charged state of the high-voltage battery 31 refers to a percentage of a remaining charged amount of the high-voltage battery 31. For example, the "SOC" of the high-voltage battery 31 can be defined as a ratio of a charged amount to fully charged capacity of the high-voltage battery 31. For example, if the high-voltage battery 31 is fully charged, the SOC is 100%; if the high-voltage battery 31 is fully discharged, the SOC is 0%.

The battery sensor 71 provided in the low-voltage battery 32 detects a charge or discharge electric current, a terminal voltage, a temperature, an SOC, and other factors of the low-voltage battery 32. For example, the "SOC" of the low-voltage battery 32 which indicates a charged state of the high-voltage battery 31 refers to a percentage of a remaining charged amount of the low-voltage battery 32. The "SOC" of the low-voltage battery 32 can be defined as a ratio of a charged amount to fully charged capacity of the high-voltage battery 31. For example, if the low-voltage battery 32 is fully charged, the SOC is 100%. If the low-voltage battery 32 is fully discharged, the SOC is 0%.

Regular and Backup Modes

Figure 3:
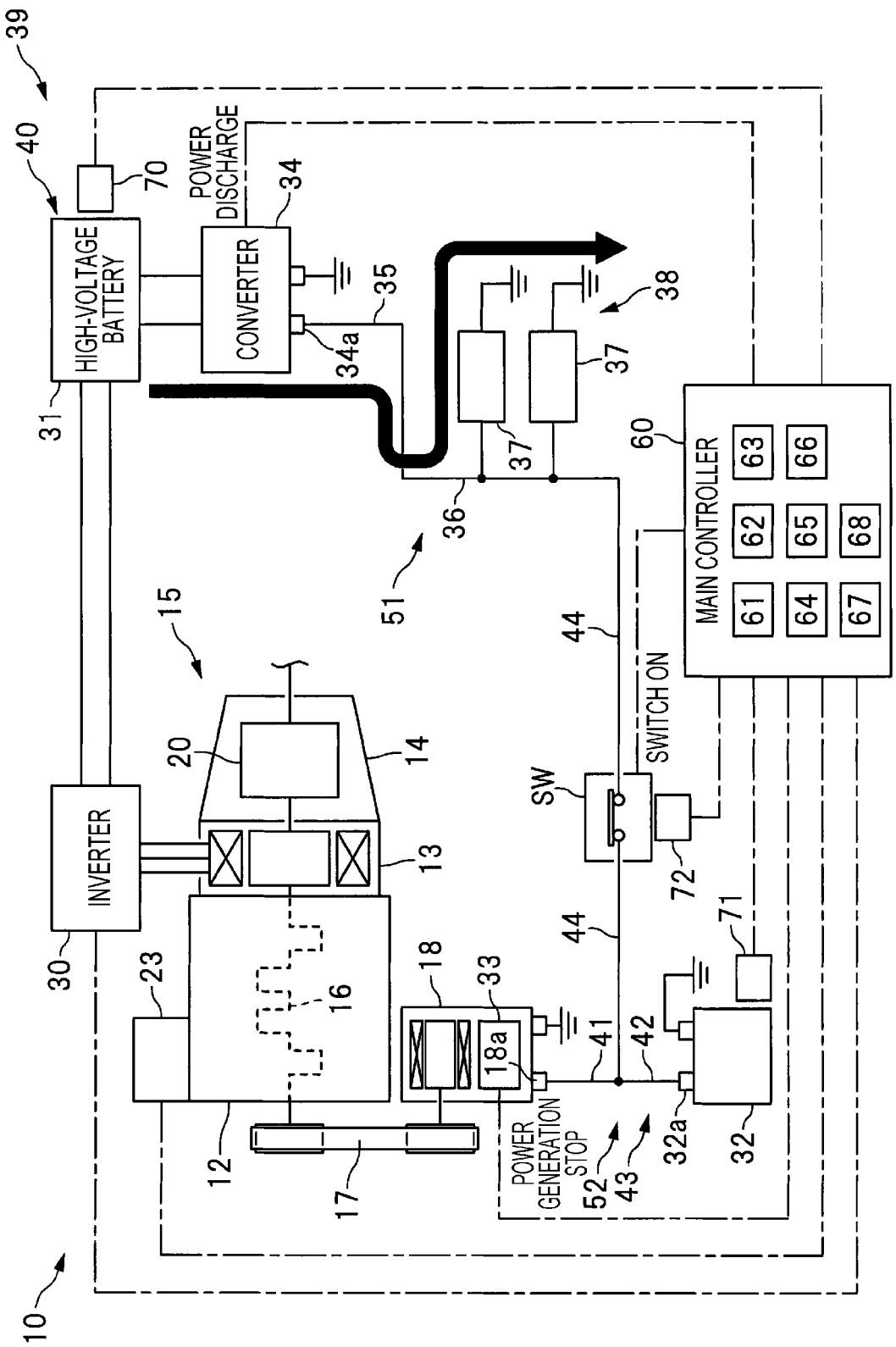
FIG. 3 illustrates an example of a power supply status in a regular mode.
Figure 4:
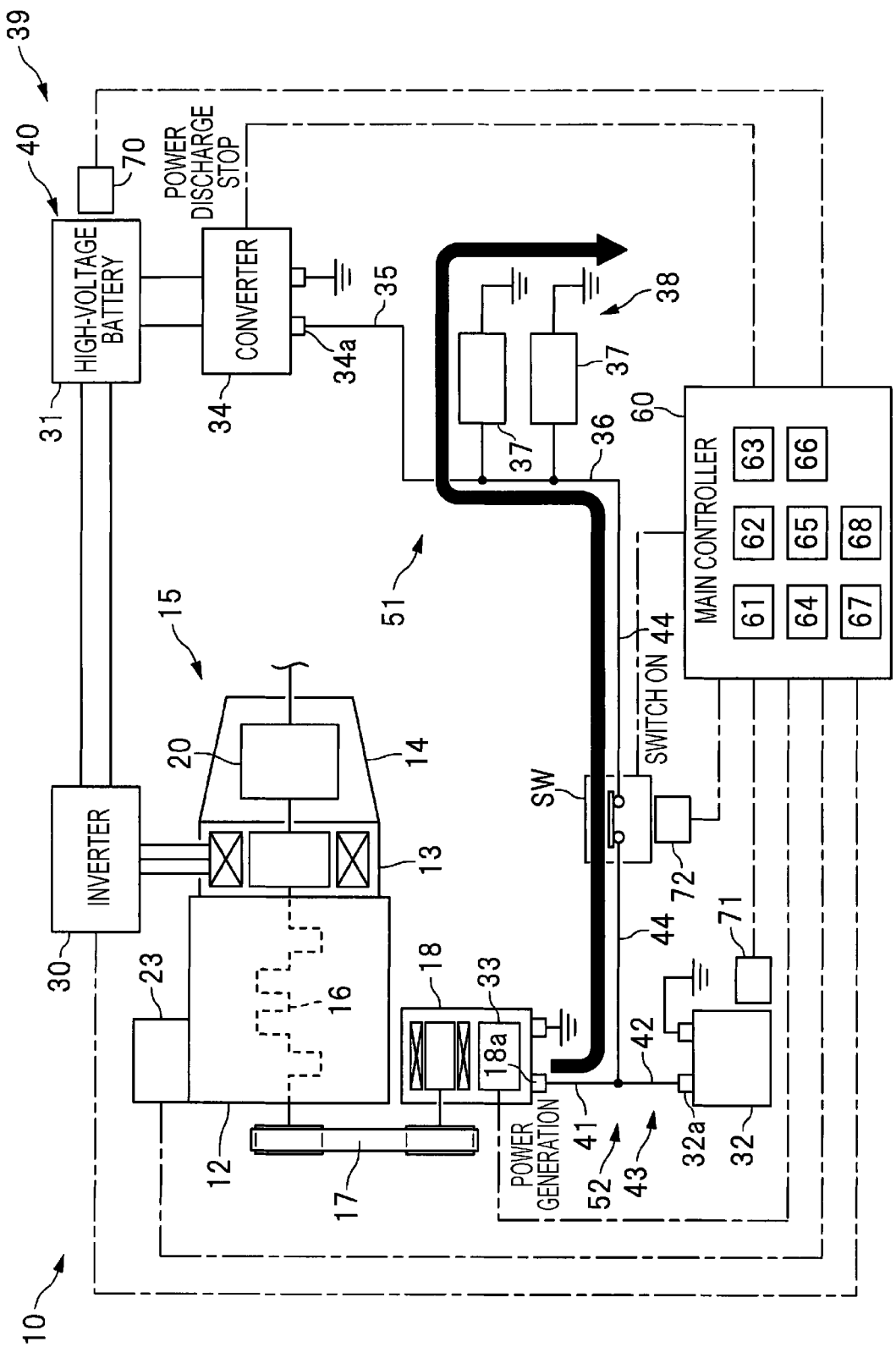
FIG. 4 illustrates an example of a power supply status in a backup mode.

Next, a description will be given below of the supply of electric power to the electrical apparatuses 37 in the power supply device 10. As described above, when the electric power is supplied to the electrical apparatuses 37, the power supply device 10 operates in the regular or backup mode. FIG. 3 illustrates an example of a power supply status in the regular mode; FIG. 4 illustrates an example of a power supply status in the backup mode. In each of FIGS. 3 and 4, the black arrow indicates the power supply status.

As illustrated in FIG. 3, when the power supply device 10 operates in the regular mode, the main controller 60 instructs the converter 34 to discharge the electric power. When receiving this instruction, the converter 34 causes the high-voltage battery 31 to supply the electric power to the electrical apparatuses 37 while regulating the discharge voltage. Simultaneously, the main controller 60 also instructs the starter generator 18 to stop generating the electric power. As a result, the first power supply 40 supplies the electric power to the electrical apparatuses 37, but the second power supply 43 supplies no electric power to the electrical apparatuses 37. Moreover, the main controller 60 instructs the switch SW to be turned on. In response to this instruction, the switch SW couples the first power supply system 51 to the second power supply system 52. As a result, even if some electrical apparatuses 37 temporarily consume larger amounts of electric power, the low-voltage battery 32 can supply a sufficient amount of electric power to the electrical apparatuses 37, thereby helping the electrical apparatuses 37 operate stably. It should be noted that the engine 12 may or may not operate in the regular mode.

As illustrated in FIG. 4, when the power supply device 10 operates in the backup mode, the main controller 60 instructs the starter generator 18 to generate the electric power and also instructs the switch SW to be turned on. When receiving the instruction, the starter generator 18 supplies the electric power to the electrical apparatuses 37 via the switch SW while generating the generated voltage to a target voltage. Simultaneously, the main controller 60 instructs the converter 34 to stop discharging the electric power. As a result, the second power supply 43 supplies the electric power to the electrical apparatuses 37, but the first power supply 40 supplies no electric power to the electrical apparatuses 37. As a result, even if some electrical apparatuses 37 temporarily consume larger amounts of electric power, the low-voltage battery 32 can supply a sufficient amount of electric power to the electrical apparatuses 37, thereby helping the electrical apparatuses 37 operate stably. It should be noted that the starter generator 18 generates the electric power to operate the engine 12 in the backup mode.

Control of Switching Between Regular and Backup Modes

Figure 5:
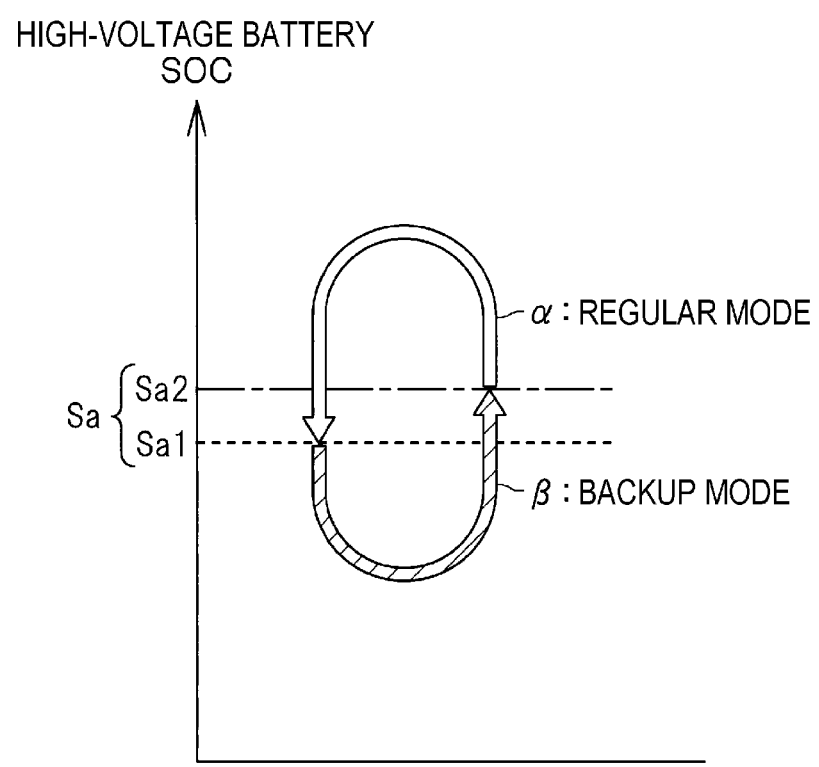
FIG. 5 is a diagram illustrating the relationship between the state of charge (SOC) of the high-voltage battery and a power supply mode.

Next, a description will be given below of control of switching between the regular and backup modes. The main controller 60 switches between these modes, based on the SOC of the high-voltage battery 31. FIG. 5 is a diagram illustrating the relationship between the SOC of the high-voltage battery 31 and the power supply mode. In FIG. 5, the arrow α defines a higher execution zone of the regular mode, and the arrow β defines a lower execution zone of the backup mode. In FIG. 5, two lower limits Sa, or a first lower limit Sa1 and a second lower limit Sa2, are set to reduce control hunting caused in response to switching between the regular and backup modes. The SOC of the high-voltage battery 31 is compared to both the first lower limit Sa1 and the second lower limit Sa2; the first lower limit Sa1 is higher than the second lower limit Sa2.

Once the SOC of the high-voltage battery 31 exceeds the second lower limit Sa2, the power supply device 10 operates in the regular mode and continues this regular mode until the SOC decreases below the first lower limit Sa1, as indicated by the arrow α in FIG. 5. In other words, when the SOC of the high-voltage battery 31 falls within the above higher execution zone, the main controller 60 executes the regular mode to use the electric power supplied from the high-voltage battery 31. In short, when the SOC of the high-voltage battery 31 is above a lower limit, the main controller 60 executes the regular mode in which the high-voltage battery 31 is permitted to discharge the electric power, and the first power supply 40 thereby supplies the electric power to the electrical apparatuses 37.

Once the SOC of the high-voltage battery 31 decreases below the first lower limit Sa1, the power supply device 10 operates in the backup mode and continues this backup mode until the SOC exceeds the second lower limit Sa2, as indicated by the arrow β in FIG. 5. In other words, when the SOC of the high-voltage battery 31 falls within the above lower execution zone, the main controller 60 selects the backup mode as the power supply mode and does not use the electric power supplied from the high-voltage battery 31. In short, when the SOC of the high-voltage battery 31 is below a lower limit, the main controller 60 executes the backup mode in which the high-voltage battery 31 is prohibited from discharging the electric power, and the second power supply 43 thereby supplies the electric powers to the electrical apparatuses 37.

In FIG. 5, the two lower limits Sa, or the first lower limit Sa1 and the second lower limit Sa2, are set to switch between the regular and backup modes; however, a different number of lower limits may be set instead. Alternatively, a single lower limit may be set. In this case, when the SOC of the high-voltage battery 31 is above a lower limit, the main controller 60 may execute the regular mode, whereas when the SOC of the high-voltage battery 31 is below the lower limit, the main controller 60 may execute the backup mode.

Control of Switching Between Regular and Backup Modes (Timing Chart)

Figure 6:
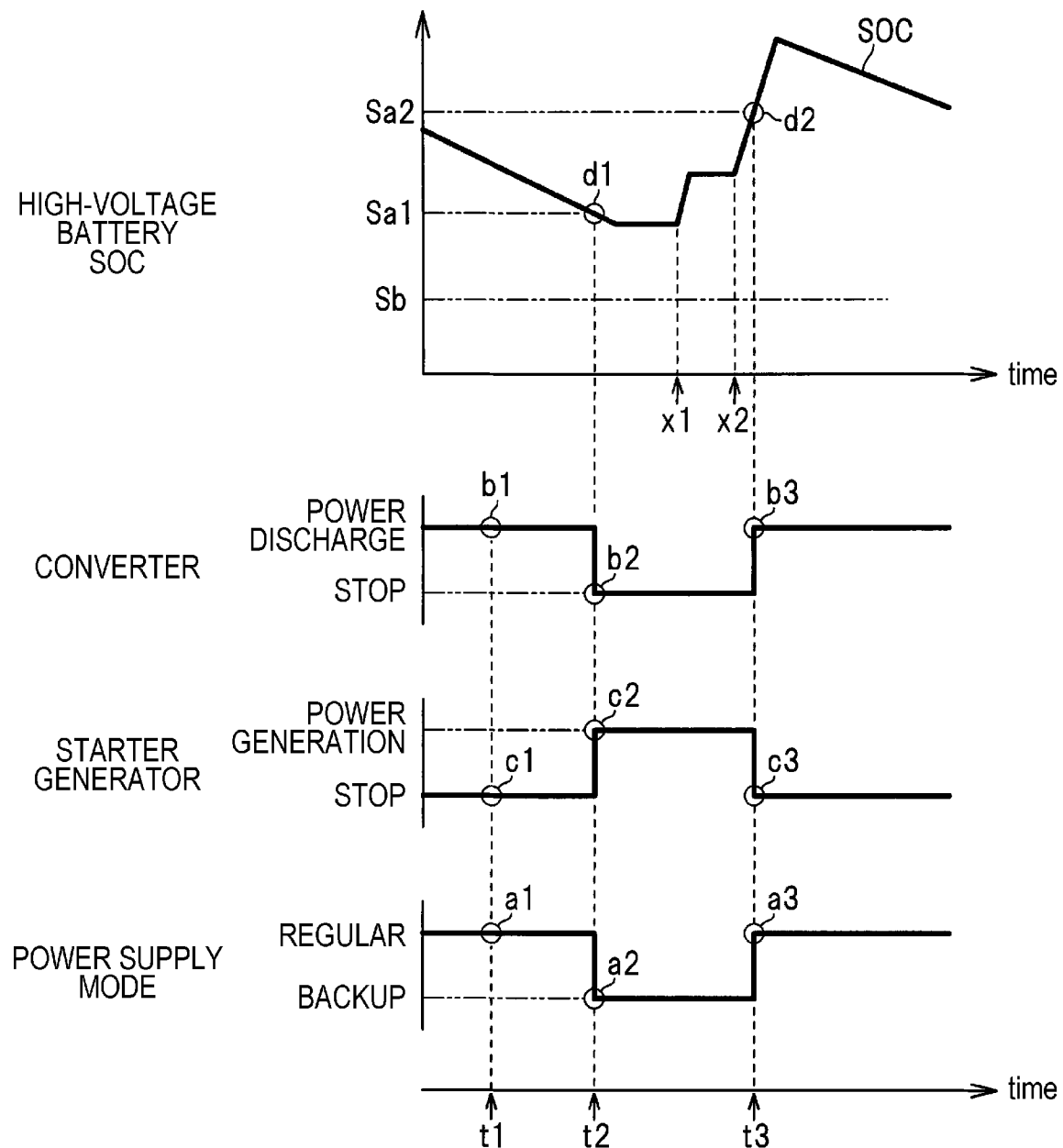
FIG. 6 is a timing chart in an example of a control process of switching between the regular mode and the backup mode.

Next, a description will be given below of control of switching between the regular and backup modes with reference to a timing chart. FIG. 6 is a timing chart in an example of the control process of switching between the regular and backup modes.

Referring to FIG. 6, at a time t1, the main controller 60 sets the power supply mode to the regular mode, as denoted by a1. In response, the converter 34 enters a power discharge state to cause the high-voltage battery 31 to supply the electric power to the electrical apparatuses 37, as denoted by b1, and the starter generator 18 stops generating the electric power, as denoted by c1. Then, the SOC of the high-voltage battery 31 decreases with the execution of the regular mode. At a time t2, the SOC of the high-voltage battery 31 becomes lower than the first lower limit Sa1, as denoted by d1. In response, the main controller 60 switches the power supply mode from the regular mode to the backup mode, as denoted by a2. In this backup mode, the starter generator 18 enters a power generation state to cause the starter generator 18 to supply the electric power to the electrical apparatuses 37, as denoted by c2, and the converter 34 stops generating the electric power, as denoted by b2.

When the backup mode is executed, the high-voltage battery 31 stops discharging the electric power, thereby controlling the decrease in the SOC of the high-voltage battery 31. When the vehicle 11 decelerates, the power supply device 10 enters a power regeneration state. In response, the motor generator 13 generates the electric power to increase the SOC of the high-voltage battery 31, as indicated by the arrows x1 and x2. Then, the SOC of the high-voltage battery 31 increases with the regeneration of the electric power in the motor generator 13. When this SOC exceeds the second lower limit Sa2 at a time t3, as denoted by d2, the main controller 60 switches the power supply mode from the backup mode to the regular mode, as denoted by a3. In this regular mode, the converter 34 enters the power discharge state to cause the high-voltage battery 31 to supply the electric power to the electrical apparatuses 37, as denoted by b3, and the starter generator 18 stops generating the electric power, as denoted by c3.

As described above, when the SOC of the high-voltage battery 31 is sufficiently high, the main controller 60 executes the regular mode to supply the electric power from the high-voltage battery 31 to the electrical apparatuses 37. In this case, the starter generator 18 stops generating the electric power to lighten a load on the engine 12, thereby decreasing the fuel consumption. Furthermore, since the SOC of the high-voltage battery 31 decreases in the regular mode, an available capacity of the high-voltage battery 31 is reserved. As a result, the motor generator 13 can regenerate the electric power whenever the vehicle 11 decelerates, thereby increasing the energy efficiency of the vehicle 11. When the SOC of the high-voltage battery 31 greatly decreases, the main controller 60 executes the backup mode to supply the electric power from the starter generator 18 to the electrical apparatuses 37. In this case, the high-voltage battery 31 stops discharging the electric power. Thus, the operation in the backup mode can appropriately suppress the high-voltage battery 31 from excessively discharging the electric power. As described above, when the vehicle 11 decelerates, the motor generator 13 enters the power discharge state to regenerate the electric power, thereby increasing the SOC of the high-voltage battery 31. Consequently the power supply device 10 operates in the regular mode during much of the time when the vehicle 11 is running.

Switch Control Upon Engine Start

Figure 7:
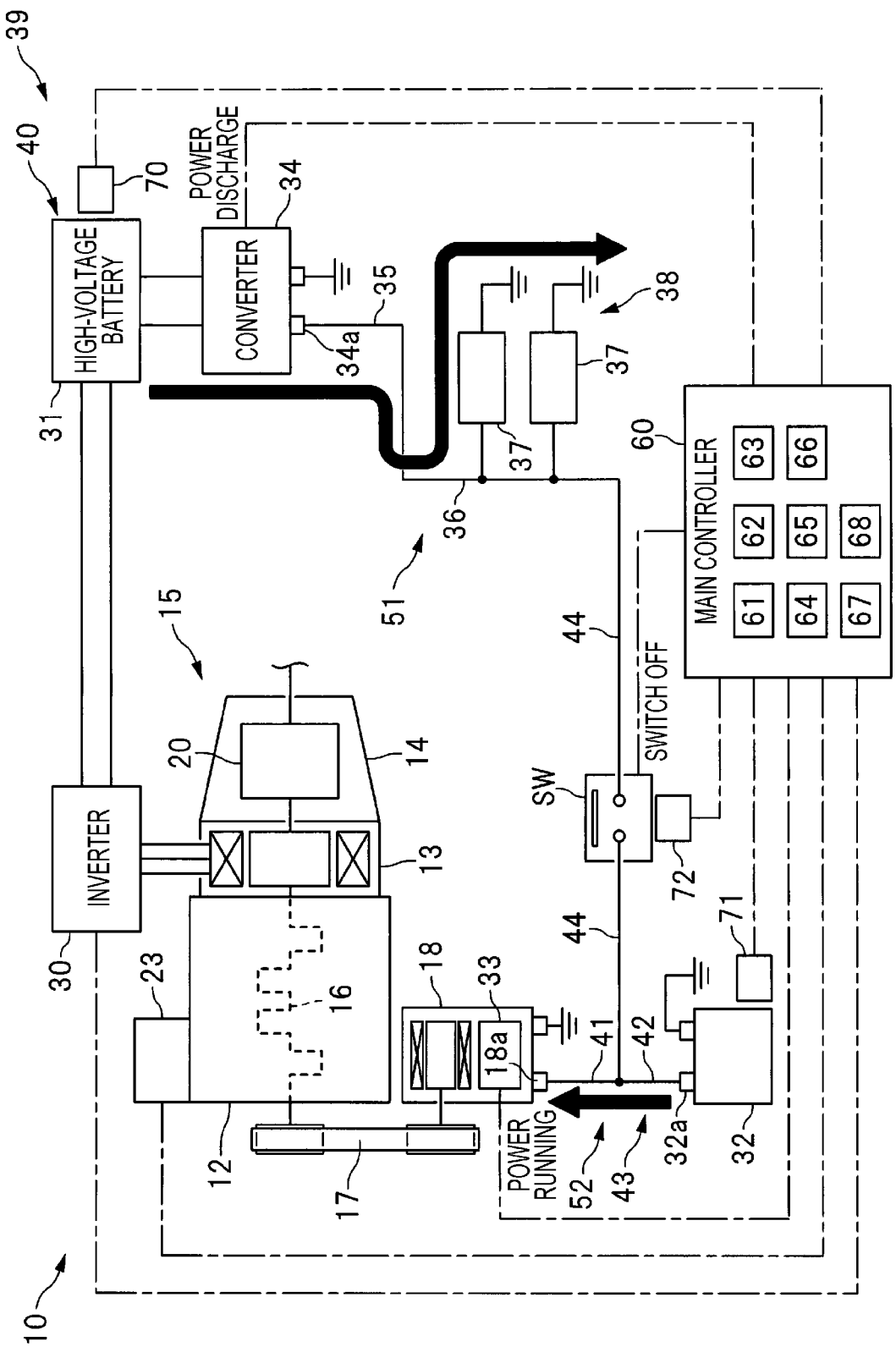
FIG. 7 illustrates an example of the power supply status when the engine starts up.

As described above, the switch SW disposed between the first power supply system 51 and the second power supply system 52 couples them together or separates them from each other. When the starter generator 18 starts rotating the engine 12, the switch SW is switched off in order to operate the electrical apparatuses 37 properly. FIG. 7 illustrates an example of the power supply status when the engine 12 starts up. The black arrows indicate the power supply status.

When the starter generator 18 starts rotating the engine 12 as illustrated in FIG. 7, the main controller 60 sets the converter 34 to the power discharge state, switches off the switch SW, and sets the starter generator 18 to the power running state. In short, when the engine 12 starts rotating, the starter generator 18 is set to the power running state, and the switch SW is turned off to separate the first power supply system 51 from the second power supply system 52. In some cases, however, the starter generator 18 may consume a larger amount of electric power in response to a cranking operation and instantaneously applies a lower voltage to the electrical apparatuses 37. Even in these cases, the above operation can help the electrical apparatuses 37 operate properly, because the switch SW blocks the electric power generated by the first power supply system 51 from being supplied to the starter generator 18.

Protection Mode

As described above, the switch SW is disposed between the first power supply system 51 and the second power supply system 52 in order to operate the electrical apparatuses 37 properly even when the starter generator 18 consumes a large amount of electric power. As illustrated in FIG. 4, when the main controller 60 executes the backup mode in order to control a decrease in the SOC of the high-voltage battery 31, the starter generator 18 supplies an electric current to the electrical apparatuses 37 via the switch SW. This electric current may excessively increase a temperature, referred to below as a switch temperature Tsw, of the switch SW to damage the switch SW. Thus, the power supply device 10 is configured to suppress an excessive increase in the switch temperature Tsw in the backup mode.

Figure 8:
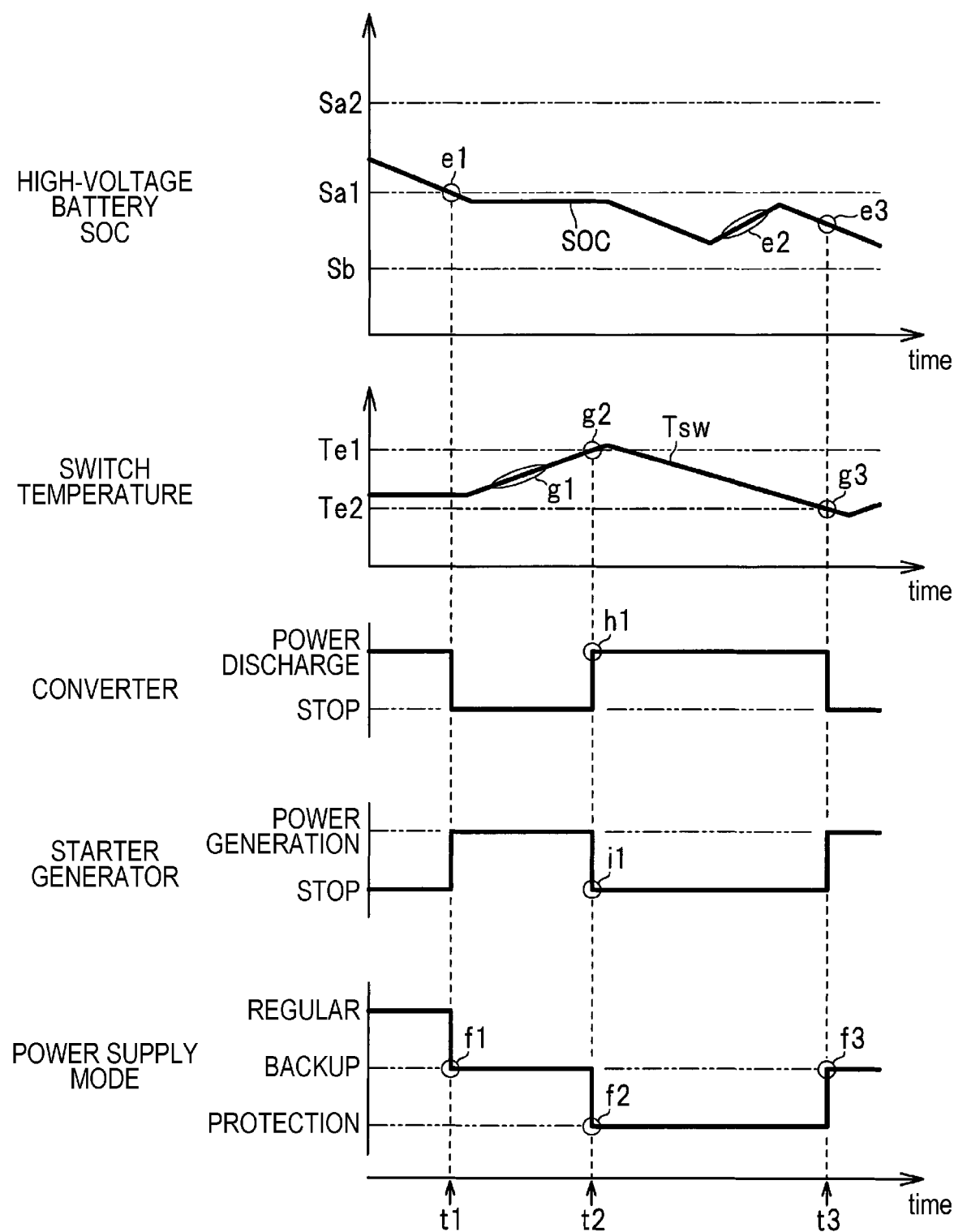
FIG. 8 is a timing chart in an example of the execution status of a protection mode.
Figure 9:
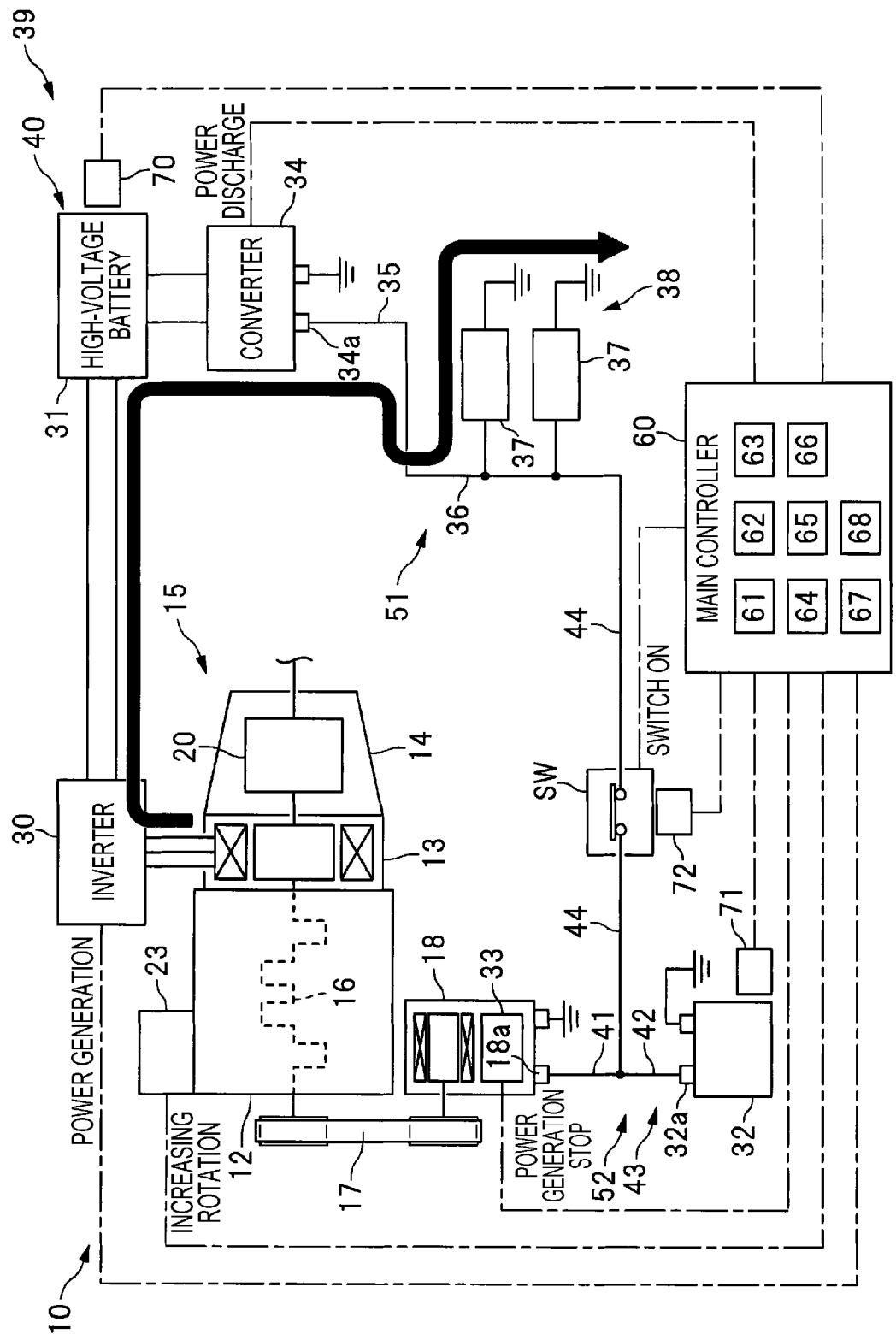
FIG. 9 illustrates an example of the power supply status in the protection mode.

In addition to the regular and backup modes, the power supply device 10 can also operate in a protection mode to protect the switch SW. FIG. 8 is a timing chart in an example of the execution status of the protection mode; FIG. 9 illustrates an example of the power supply status in the protection mode. The black arrow indicates the power supply status.

Referring to FIG. 8, the SOC of the high-voltage battery 31 first decreases with the execution of the regular mode. At a time t1, the SOC of the high-voltage battery 31 decreases below the first lower limit Sa1, as denoted by e1. In response, the main controller 60 switches the power supply mode from the regular mode to the backup mode, as denoted by f1. Since the electric current flows through the switch SW in the backup mode as illustrated in FIG. 4, the switch temperature Tsw gradually increases, as denoted by g1. At a time t2, the switch temperature Tsw exceeds a temperature threshold Te1, as denoted by g2. In this case, the main controller 60 determines that an abnormality occurs in the switch SW due to its temperature rise and thus switches the power supply mode from the backup mode to the protection mode, as denoted by f2. In this protection mode, the converter 34 enters the power discharge state, as denoted by h1, and the starter generator 18 stops generating the electric power, as denoted by i1.

As illustrated in FIG. 9, when the power supply device 10 operates in the protection mode, the main controller 60 instructs the converter 34 to discharge the electric power. When receiving this instruction, the converter 34 causes the high-voltage battery 31 to supply the electric power to the electrical apparatuses 37 while regulating the discharge voltage to a target voltage. Simultaneously, the main controller 60 instructs the starter generator 18 to stop generating the electric power. At the time when the power supply mode is switched from the backup mode to the protection mode, the main controller 60 causes the converter 34 to increase the voltage discharged from the high-voltage battery 31 and then causes the starter generator 18 to decrease the generated voltage. In this way, the electric power can be continuously supplied to the electrical apparatuses 37 even when the second power supply 43 replaces the first power supply 40 as the power source for the electrical apparatuses 37. This operation decreases the electric current flowing through the switch SW, thereby protecting the switch SW from being overheated.

As illustrated in FIG. 9, when the power supply device 10 operates in the protection mode, the main controller 60 instructs the engine accessory 23 to increase the number of revolutions and also instructs the inverter 30 to generate the electric power. In response to these instructions, the engine accessory 23 increases the number of revolutions, and the inverter 30 causes the motor generator 13 to generate the electric power. Since the high-voltage battery 31 discharges the electric power in the protection mode, this operation actively charges the high-voltage battery 31, thereby reducing the risk of the high-voltage battery 31 being overdischarged. It is obvious that the clutch mechanism 19 is engaged when the engine 12 drives the motor generator 13.

As illustrated in FIG. 8, a lower limit Sb that is lower than the first lower limit Sa1 is set as a lower limit for the SOC of the high-voltage battery 31 in the protection mode. When the power supply device 10 operates in both the regular and backup modes described above, the high-voltage battery 31 is prohibited from discharging with the SOC kept below the first lower limit Sa1. However, when the power supply device 10 operates in the protection mode, the high-voltage battery 31 is permitted to discharge the electric power with the SOC kept below the first lower limit Sa1. In short, in order to protect the switch SW, the high-voltage battery 31 is permitted to temporarily discharge the electric power in the protection mode until the SOC of the high-voltage battery 31 reaches the lower limit Sb.

At a time t3 in FIG. 8, the switch temperature Tsw in the protection mode decreases below the temperature threshold Te2, as denoted by g3. In response, the main controller 60 switches the power supply mode from the protection mode to the regular or backup mode. In FIG. 8, the starter generator 18 regenerates the electric power to slightly increase the SOC of the high-voltage battery 31, as denoted by e2, but the SOC still hovers below the second lower limit Sa2, as denoted by e3. Hence, the main controller 60 switches the power supply mode to the backup mode, as denoted by f3. In FIG. 8, the SOC of the high-voltage battery 31 gradually decreases in the protection mode; however, the SOC does not necessarily have to gradually decrease. Alternatively, the motor generator 13 may generate a larger amount of electric power in the protection mode to greatly increase the SOC of the high-voltage battery 31.

At the time t3 in FIG. 8, the SOC of the high-voltage battery 31 is below the second lower limit Sa2, and the main controller 60 hence switches the power supply mode to the backup mode. However, if the SOC of the high-voltage battery 31 is above the second lower limit Sa2 at the time t3 in FIG. 8, the main controller 60 switches the power supply mode to the regular mode. When the SOC of the high-voltage battery 31 decreases below the lower limit Sb in the protection mode, the main controller 60 switches the power supply mode from the protection mode to the backup mode in order to protect the high-voltage battery 31 from being over-discharged. The switch SW is kept in the ON state in the protection mode, similar to in the regular and backup modes. As a result, the switch SW is kept in the ON state whenever the power supply mode is switched, and the power supply mode thereby can be switched easily.

Control of Switching Power Supply Mode (Flowchart)

Figure 10:
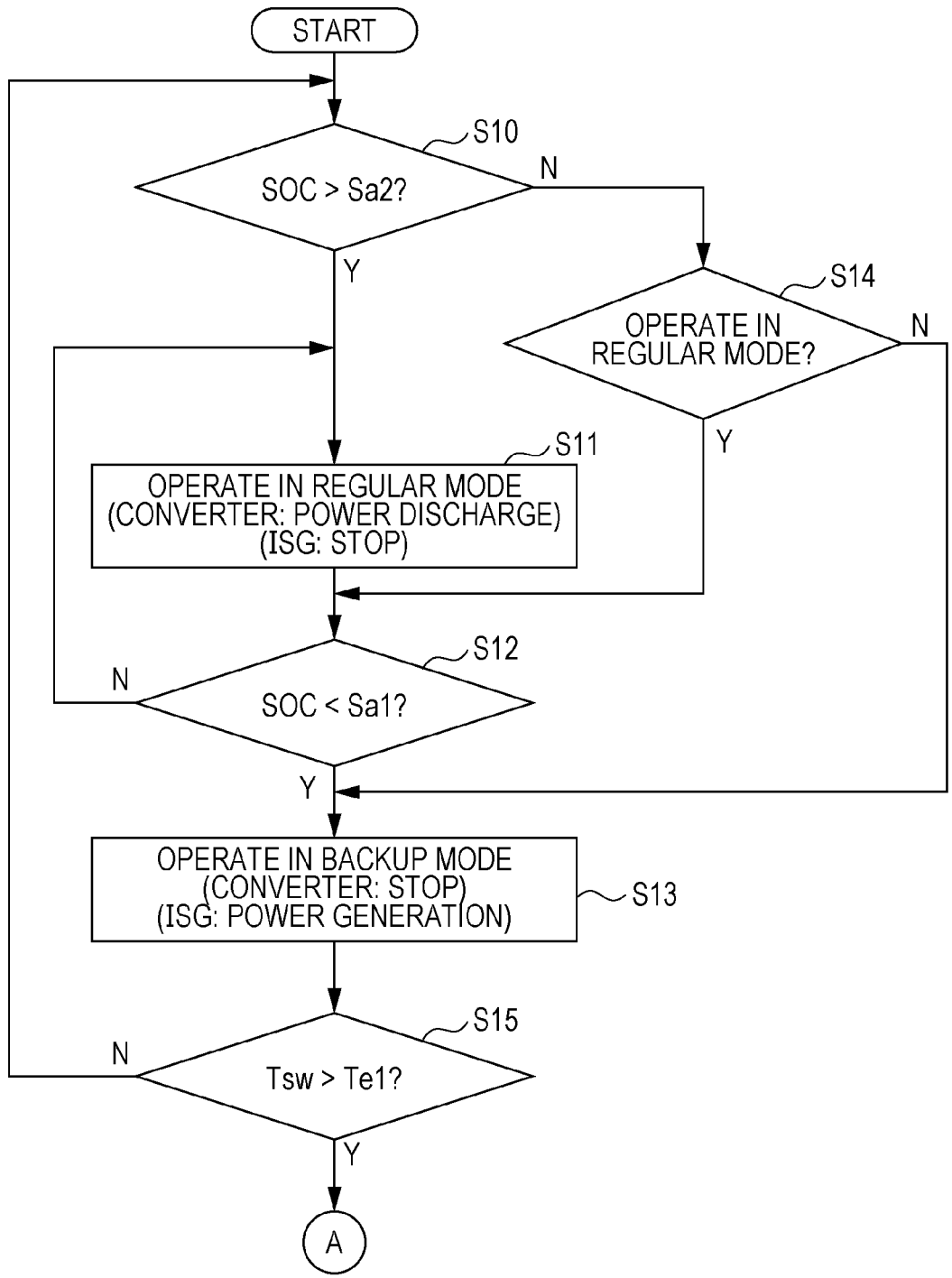
FIG. 10 is a first flowchart of an example of a process of switching the power supply mode.

Next, a description will be given below of the control of switching between the power supply mode, described above, with reference to a flowchart. FIG. 10 is a first flowchart of an example of a process of switching the power supply mode; FIG. 11 is a second flowchart of the example of the process of switching the power supply mode. The first flowchart in FIG. 10 is continued to the second flowchart in FIG. 11 via the mark A.

As illustrated in FIGS. 10 and 11, at Step S10, the main controller 60 determines whether the SOC of the high-voltage battery 31 exceeds the second lower limit Sa2. When determining that the SOC exceeds the second lower limit Sa2 (Y at Step S10), the main controller 60 considers that the charged amount of the high-voltage battery 31 is sufficiently large and proceeds to Step S11, at which the main controller 60 executes the regular mode. At Step S12, the high-voltage battery 31 determines whether the SOC of the high-voltage battery 31 decreases below the first lower limit Sa1. When determining that the SOC does not decrease below the first lower limit Sa1 (N at Step S12), the main controller 60 considers that the charged amount of the high-voltage battery 31 is sufficiently large and returns to Step S11, at which the power supply device 10 continues to operate in the regular mode. In this way, once the SOC of the high-voltage battery 31 exceeds the second lower limit Sa2, the power supply device 10 operates in the regular mode and continues this regular mode until the SOC decreases below the first lower limit Sa1.

When determining that the SOC decreases below the first lower limit Sa1 (Y at Step S12), the main controller 60 considers that the charged amount of the high-voltage battery 31 is insufficiently small and proceeds to Step S13, at which the main controller 60 executes the backup mode. When determining that the SOC does not exceed the second lower limit Sa2 (N at Step S10), the main controller 60 proceeds to Step S14 and determines whether the power supply device 10 is operating in the regular mode. When determining that the power supply device 10 is not operating in the regular mode (N at Step S14), namely, is operating in the backup mode, the main controller 60 proceeds to Step S13, at which the power supply device 10 continues to operate in the backup mode. When determining that the power supply device 10 is operating in the regular mode (Y at Step S14), the main controller 60 proceeds to Step S12 described above. In this way, once the SOC of the high-voltage battery 31 decreases below the first lower limit Sa1, the power supply device 10 operates in the backup mode and continues this backup mode until the SOC exceeds the second lower limit Sa2.

After having executed the backup mode at Step S13, the main controller 60 proceeds to Step S15 and determines whether the switch temperature Tsw exceeds the temperature threshold Te1. When determining that the switch temperature Tsw does not exceed the temperature threshold Te1 (N at Step S15), the main controller 60 determines that the switch temperature Tsw is not excessively high and returns to Step S10, at which the main controller 60 executes the regular or backup mode, based on the SOC of the high-voltage battery 31. When determining that the switch temperature Tsw exceeds the temperature threshold Te1 (Y at Step S15), the main controller 60 determines that the switch temperature Tsw is excessively high and proceeds to Step S16, at which the main controller 60 uses the lower limit Sb as the lower limit for the SOC of the high-voltage battery 31, instead of the first lower limit Sa1 and the second lower limit Sa2. Then, the main controller 60 proceeds to Step S17, at which the main controller 60 executes the protection mode.

At Step S18, the main controller 60 determines whether the switch temperature Tsw decreases below the temperature threshold Te2. When determining that the switch temperature Tsw does not decrease below the temperature threshold Te2 (N at Step S18), the main controller 60 considers that the switch temperature Tsw does not sufficiently decrease and returns to Step S17, at which the power supply device 10 continues to operate in the protection mode. When determining that the switch temperature Tsw decreases below the temperature threshold Te2 (Y at Step S18), the main controller 60 considers that the switch temperature Tsw sufficiently decreases and proceeds to Step S19, at which the power supply device 10 finishes operating in the protection mode, and the main controller 60 uses the first lower limits Sa1 and the second lower limit Sa2 instead of the lower limit Sb.

As described above, when detecting that an abnormality occurs in the switch SW under the execution of the backup mode, the main controller 60 executes the protection mode to use the first power supply 40 as the power source for the electrical apparatuses 37, instead of the second power supply 43. This operation can decrease the electric current flowing through the switch SW, thereby protecting the switch SW from being overheated. In the above control process, the main controller 60 detects that an abnormality occurs in the switch SW, based on the switch temperature Tsw; however, the main controller 60 may employ another detection method. Alternatively, the main controller 60 may detect that an abnormality occurs in the switch SW, based on the resistance of the switch SW which is detected by the switch sensor 72. In this case, when the resistance of the switch SW exceeds a preset threshold, the main controller 60 may consider that abnormality occurs in the switch SW and may switch the power supply mode from the backup mode to the protection mode.

It is obvious that the disclosure is not limited to the foregoing embodiment and various modifications are possible within the scope of the claims. In the foregoing embodiment, the converter 34 that decreases the direct-current (DC) power is disposed in the first power supply 40, because the voltage of the high-voltage battery 31 is higher than that of the low-voltage battery 32. However, the converter 34 may be removed from the first power supply 40, in which case the high-voltage battery 31 may be directly coupled in parallel to the low-voltage battery 32 and the difference between the voltages of the high-voltage battery 31 and the low-voltage battery 32 may be set to within a preset range.

The high-voltage battery 31 does not necessarily have to be a lithium ion battery or a lead battery with a terminal voltage of about 100 V. Alternatively, the high-voltage battery 31 may be a power storage with a terminal voltage other than 100 V or may be a capacitor or other type of battery. Likewise, the low-voltage battery 32 does not necessarily have to be a lithium ion battery or a lead battery with a terminal voltage of about 12 V. Alternatively, the low-voltage battery 32 may be a power storage with a terminal voltage other than 12 V or may be a capacitor or other type of battery.

In the foregoing embodiment, the motor generator 13 serves as both a generator and a motor; however, the motor generator 13 may serve only as a generator. Likewise, the starter generator 18 serves as both a generator and a motor; however, the starter generator 18 may serve only as a generator.

In the foregoing embodiment, when the starter generator 18 enters the power running state during the startup of the engine 12, the switch SW is turned off; however, the timing when the switch SW is turned off is not limited. For example, the switch SW may also be turned off when a high-power, electrically-driven actuator starts operating, so that it is possible to suppress the voltage applied to the electrical apparatuses 37 from decreasing instantaneously. Furthermore, the engine 12 rotates the motor generator 13 in the protection mode to generate the electric power; however, the motor generator 13 does not necessarily have to generate the electric power in the protection mode. Alternatively, the motor generator 13 may stop generating the electric power in the protection mode.

In the foregoing embodiment, the engine controller 61, the motor controller 62, the ISG controller 63, the converter controller 64, the switch controller 65, the first mode controller 66, the second mode controller 67, and the third mode controller 68 are all disposed in the main controller 60. However, the configuration of these controllers is not limited. Alternatively, the engine controller 61, the motor controller 62, the ISG controller 63, the converter controller 64, the switch controller 65, the first mode controller 66, the second mode controller 67, and the third mode controller 68 may be disposed in another or other controllers.

As described above, when detecting that an abnormality occurs in the switch SW under the execution of the backup mode, the main controller 60 in the power supply device 10 executes the protection mode to supply the electric power from the first power supply 40 to the electrical apparatuses 37. In this protection mode, the high-voltage battery 31 is permitted to discharge the electric power with its SOC kept below the first lower limit Sa1. In this way, the power supply device 10 successfully protects the switch SW.

The invention claimed is:

1. A power supply device to be mounted in a vehicle, the device comprising:
   a first power supply system comprising a first power supply and an electrical apparatus coupled to the first power supply, the first power supply comprising a first power storage and a first generator;
   a second power supply system comprising a second power supply comprising a second power storage and a second generator;
   a switch disposed between the first power supply system and the second power supply system, the switch configured to be turned on to couple the first power supply system to the second power supply system or turned off to separate the first power supply system from the second power supply system;
   a first mode controller configured to, when a state of charge (SOC) of the first power storage exceeds a lower limit, execute a first power supply mode to supply electric power from the first power supply to the electrical apparatus, the first power supply mode permitting the first power storage to discharge the electric power,
   a second mode controller configured to, when the SOC of the first power storage decreases below the lower limit, execute a second power supply mode to supply electric power from the second power supply to the electrical apparatus via the switch, the second power supply mode prohibiting the first power storage from discharging the electric power; and
   a third mode controller configured to, in a case where an occurrence of an abnormality is detected in the switch during the second power supply mode, execute a third power supply mode to supply the electric power from the first power supply to the electrical apparatus, the third power supply mode permitting the first power storage to discharge the electric power with the SOC kept below the lower limit.

2. The power supply device according to claim 1, wherein when the first power supply mode, the second power supply mode, or the third power supply mode is executed, the switch is turned on.

3. The power supply device according to claim 2, wherein the second generator is a power generation motor configured to enter a power running state during start-up of the engine, and
the switch is turned off during the start-up of the engine.

4. The power supply device according to claim 1, wherein when setting the third power supply mode, the third mode controller causes the first generator to generate electric power to charge the first power storage.

5. The power supply device according to claim 2, wherein when setting the third power supply mode, the third mode controller causes the first generator to generate electric power to charge the first power storage.

6. The power supply device according to claim 3, wherein when setting the third power supply mode, the third mode controller causes the first generator to generate electric power to charge the first power storage.

7. The power supply device according to claim 1, wherein a voltage of the first power storage is higher than a voltage of the second power storage, and
the first power supply includes a converter configured to convert the voltage of the first power supply.

8. The power supply device according to claim 2, wherein a voltage of the first power storage is higher than a voltage of the second power storage, and
the first power supply includes a converter configured to convert the voltage of the first power supply.

9. The power supply device according to claim 3, wherein a voltage of the first power storage is higher than a voltage of the second power storage, and
the first power supply includes a converter configured to convert the voltage of the first power supply.

10. The power supply device according to claim 1, wherein
the case where an occurrence of an abnormality is detected in the switch corresponds to a case where a temperature of the switch exceeds a threshold.

11. The power supply device according to claim 2, wherein
the case where an occurrence of an abnormality is detected in the switch corresponds to a case where a temperature of the switch exceeds a threshold.

12. The power supply device according to claim 3, wherein
the case where an occurrence of an abnormality is detected in the switch corresponds to a case where a temperature of the switch exceeds a threshold.

13. A power supply device to be mounted in a vehicle, the device comprising:
   a first power supply system comprising a first power supply and an electrical apparatus coupled to the first power supply, the first power supply comprising a first power storage and a first generator;

a second power supply system comprising a second power supply comprising a second power storage and a second generator;

a switch disposed between the first power supply system and the second power supply system, the switch configured to be turned on to couple the first power supply system to the second power supply system or turned off to separate the first power supply system from the second power supply system; and circuitry configured to when a state of charge (SOC) of the first power storage exceeds a lower limit, execute a first power supply mode to supply electric power from the first power supply to the electrical apparatus, the first power supply mode permitting the first power storage to discharge the electric power, when the SOC of the first power storage decreases below the lower limit, execute a second power supply mode to supply electric power from the second power supply to the electrical apparatus via the switch, the second power supply mode prohibiting the first power storage from discharging the electric power, and in a case where an occurrence of an abnormality is detected in the switch during the second power supply mode, execute a third power supply mode to supply the electric power from the first power supply to the electrical apparatus, the third power supply mode permitting the first power storage to discharge the electric power with the SOC kept below the lower limit.

* * * * *